United States Patent
He et al.

(10) Patent No.: US 11,255,713 B2
(45) Date of Patent: Feb. 22, 2022

(54) DEVICE AND METHOD FOR MEASURING AMOUNT OF LIQUID CHEMICAL IN PLANT PROTECTION UNMANNED AERIAL VEHICLE (UAV)

(71) Applicant: Zhejiang University, Hangzhou (CN)

(72) Inventors: Yong He, Hangzhou (CN); Jiangpeng Zhu, Hangzhou (CN); Liwen He, Hangzhou (CN)

(73) Assignee: Zhejiang University, Hangzhou (CN)

(*) Notice: Subject to any disclaimer, the term of this patent is extended or adjusted under 35 U.S.C. 154(b) by 46 days.

(21) Appl. No.: 16/933,231

(22) Filed: Jul. 20, 2020

(65) Prior Publication Data

US 2021/0381875 A1    Dec. 9, 2021

(30) Foreign Application Priority Data

Jun. 4, 2020   (CN) .......................... 202010501117.3

(51) Int. Cl.
*G01F 23/296*   (2006.01)
*B64C 39/02*    (2006.01)

(52) U.S. Cl.
CPC .......... *G01F 23/296* (2013.01); *B64C 39/024* (2013.01); *B64C 2201/027* (2013.01); *B64C 2201/128* (2013.01)

(58) Field of Classification Search
CPC ........ G01F 23/296; G01F 22/00; G01F 23/18; G01F 23/28; B64C 39/024; B64C 2201/128; B64C 2201/027
See application file for complete search history.

(56) References Cited

U.S. PATENT DOCUMENTS 7,426,866 B2 *  9/2008  Van Tuyl ............. G01N 29/024
                                            73/597
7,775,106 B2 *  8/2010  Rayner ................. G01F 23/284
                                            73/290 V (Continued)

FOREIGN PATENT DOCUMENTS

| CN | 2207571 Y | 9/1995 |
| CN | 102042859 A | 5/2011 |
| CN | 205593601 U | 9/2016 |

OTHER PUBLICATIONS

First Office Action in Chinese Application No. 202010501117.3 (and English translation), dated Dec. 3, 2020.

(Continued)

*Primary Examiner* — Medhat Badawi
(74) *Attorney, Agent, or Firm* — Baker & Hostetler LLP; Toni-Junell Herbert

(57) ABSTRACT

The present invention relates to a device and method for measuring the amount of a liquid chemical in a plant protection unmanned aerial vehicle (UAV). An ultrasonic sensor is adopted to measure a distance between a liquid chemical level in a liquid chemical measuring tube communicated with a liquid chemical tank and a top end of the liquid chemical measuring tube, and then a height of the liquid chemical in the liquid chemical tank is further determined according to an acquired attitude angle of the UAV and a distance between a central position of the liquid chemical measuring tube and a central position of the liquid chemical tank, thereby accurately measuring the amount of the liquid chemical in the liquid chemical tank of the UAV.

2 Claims, 2 Drawing Sheets

(56) References Cited

U.S. PATENT DOCUMENTS

| | | | | |
|---|---|---|---|---|
| 8,066,343 | B2* | 11/2011 | Nishihara | B41J 2/17566 347/7 |
| 8,104,341 | B2* | 1/2012 | Lagergren | G01F 23/0076 73/290 V |
| 8,412,473 | B2* | 4/2013 | Woltring | G01F 23/2962 702/55 |
| 8,474,314 | B2* | 7/2013 | Neuburger | G01F 23/2845 73/290 R |
| 9,146,557 | B1* | 9/2015 | Ahmed | G05D 1/085 |
| 9,395,228 | B2* | 7/2016 | Molitor | G01F 23/2961 |
| 9,719,833 | B2* | 8/2017 | Jager | G01F 23/296 |
| 9,745,060 | B2* | 8/2017 | O'Connor | A01B 79/005 |
| 9,829,369 | B2* | 11/2017 | Kuehnel | G01F 23/2962 |
| 10,072,963 | B1* | 9/2018 | Solokhin | G01F 23/296 |
| 10,171,746 | B2* | 1/2019 | Pochon | H04N 5/23238 |
| 10,359,307 | B2* | 7/2019 | Ichimura | G01F 23/22 |
| 10,795,380 | B1* | 10/2020 | Patton | G01C 21/20 |
| 10,888,898 | B2* | 1/2021 | Thornton | G01N 29/32 |
| 11,019,805 | B2* | 6/2021 | Hartung | A01K 29/00 |
| 2006/0201245 | A1* | 9/2006 | Huber | G01F 23/2962 73/290 R |
| 2007/0181764 | A1* | 8/2007 | Fehrenbach | G01D 11/30 248/300 |
| 2007/0261487 | A1* | 11/2007 | Sintes | G01F 23/2962 73/290 V |
| 2008/0066553 | A1* | 3/2008 | Espada Tejedor | G01N 29/265 73/627 |
| 2009/0288482 | A1* | 11/2009 | Faist | G01F 23/0076 73/290 R |
| 2010/0228406 | A1* | 9/2010 | Hamke | G05D 1/0094 701/3 |
| 2011/0083504 | A1* | 4/2011 | Unger | G01F 23/30 73/304 C |
| 2017/0015416 | A1* | 1/2017 | O'Connor | A01C 23/047 |
| 2017/0364093 | A1* | 12/2017 | Mari Mari | G05D 1/0202 |
| 2017/0371352 | A1* | 12/2017 | Mari Mari | B64C 29/02 |
| 2018/0039271 | A1* | 2/2018 | Rimoux | B64C 13/18 |
| 2018/0039272 | A1* | 2/2018 | Seydoux | G05D 1/101 |
| 2018/0155026 | A1* | 6/2018 | Policicchio | B64D 1/18 |
| 2020/0041623 | A1* | 2/2020 | Keyetieu | G01S 7/497 |
| 2020/0166926 | A1* | 5/2020 | Liu | B64C 39/024 |
| 2020/0255139 | A1* | 8/2020 | Nahuel-Andrejuk | B64C 39/024 |
| 2020/0257904 | A1* | 8/2020 | Sebastian | G01C 21/20 |
| 2020/0258400 | A1* | 8/2020 | Yuan | G05D 1/106 |
| 2020/0312163 | A1* | 10/2020 | Durr | G06T 7/20 |
| 2021/0188430 | A1* | 6/2021 | Kisiler | G08G 5/0043 |
| 2021/0190745 | A1* | 6/2021 | Buckingham | G01N 33/0009 |
| 2021/0202959 | A1* | 7/2021 | Sheerin | B64C 39/02 |
| 2021/0217398 | A1* | 7/2021 | Gunaseela Boopathy | G10K 11/17873 |
| 2021/0229805 | A1* | 7/2021 | Getman | H02S 10/40 |
| 2021/0271267 | A1* | 9/2021 | Thomas | G05D 1/0858 |
| 2021/0276704 | A1* | 9/2021 | Pantalone | B64C 27/467 |
| 2021/0314528 | A1* | 10/2021 | Krone | B64C 39/024 |
| 2021/0321033 | A1* | 10/2021 | Mori | H04N 5/23216 |

OTHER PUBLICATIONS

Notification to Grant Patent Right for Invention in Chinese Application No. 202010501117.3, dated Apr. 7, 2021.

* cited by examiner

DEVICE AND METHOD FOR MEASURING AMOUNT OF LIQUID CHEMICAL IN PLANT PROTECTION UNMANNED AERIAL VEHICLE (UAV)

CROSS-REFERENCE TO RELATED APPLICATIONS

This application is a non-provisional utility application, which claims priority to CN 202010501117.3 filed Jun. 4, 2020, the entire contents of which application is herein incorporated by reference.

TECHNICAL FIELD

The present invention relates to the field of liquid quantity measurement, and in particular, to a device and method for measuring the amount of a liquid chemical in a plant protection unmanned aerial vehicle (UAV).

BACKGROUND

During the autonomous flight of a plant protection UAV, its liquid chemical gradually decreases with the spraying operation. On the one hand, the reduction of the liquid chemical continuously changes the weight and center of gravity of the plant protection UAV to during operation, so it is necessary to use a flight control system of the plant protection UAV to adjust control parameters of the UAV in real time according to the remaining amount of the liquid chemical, so as to better maintain the stable flight of the aircraft. On the other hand, the flight control system of the plant protection UAV can better control the spraying speed based on the real-time remaining amount of the liquid chemical to realize autonomous task planning. In summary, real-time and accurate measurement of the remaining amount of the liquid chemical is very important to improve the operation quality of the plant protection UAV.

There are mainly two existing technologies for measuring the remaining amount of a liquid chemical as follows.

The first technology is to install a distance measuring sensor at the top of a liquid chemical tank to measure the liquid level of the liquid chemical tank so as to estimate the remaining amount of the liquid chemical in the liquid chemical tank. However, since the attitude of the plant protection UAV changes greatly and irregularly during flight, it is often necessary to adopt a tilted attitude to correct the interference caused by the external wind speed when the UAV flies in a straight line. As a result, the liquid chemical level often oscillates and it is difficult to estimate the overall amount of the liquid chemical by measuring the local liquid level.

The second technology is to install a sensor at the bottom of a liquid chemical tank to measure the pressure of the liquid chemical at the bottom of the liquid chemical tank so as to estimate the remaining amount of the liquid chemical. Because the liquid chemical generally has certain corrosivity, the sensor is in direct contact with the liquid chemical in this method, which easily leads to corrosion and damage of the sensor.

Therefore, it is an urgent technical problem in this field how to provide a method or device that can accurately measure the amount of a liquid chemical in an UAV without contact.

SUMMARY

The present invention provides a device and method for measuring the amount of a liquid chemical in a plant protection UAV, so as to accurately measure the amount of the liquid chemical in the UAV without contact.

To achieve the above purpose, the present invention provides the following technical solutions.

A device for measuring the amount of a liquid chemical in a plant protection unmanned aerial vehicle (UAV) includes a liquid chemical measuring tube, an ultrasonic sensor, a control terminal, and a liquid chemical tank;

where a first end of the liquid chemical measuring tube is communicated with a first end of the liquid chemical tank;

the ultrasonic sensor is fixedly arranged at a second end of the liquid chemical measuring tube; the control terminal is fixed at a second end of the liquid chemical tank; the ultrasonic sensor is electrically connected to the control terminal;

the ultrasonic sensor is used for measuring a distance between a liquid chemical level in the liquid chemical measuring tube and the second end of the liquid chemical measuring tube; the control terminal is used for acquiring attitude angle data of the UAV, and further used for determining the amount of the liquid in the liquid chemical tank according to the distance between the liquid chemical level in the liquid chemical measuring tube and the second end of the liquid chemical measuring tube and the attitude angle data; and the attitude angle data includes a roll angle and a pitch angle.

Preferably, the first end of the liquid chemical measuring tube is on the same horizontal plane as the first end of the liquid chemical tank; and the second end of the liquid chemical measuring tube is on the same horizontal plane as the second end of the liquid chemical tank.

Preferably, the liquid chemical measuring tube has a diameter less than or equal to 50 mm.

Preferably, the control terminal includes a master control computer and an attitude and heading reference system (AHRS);

the master control computer is electrically connected to the AHRS and the ultrasonic sensor;

the AHRS is used for measuring attitude angle data of the UAV in real time; the master control computer is used for determining the amount of the liquid in the liquid chemical tank according to the attitude angle data and the distance between the liquid chemical level in the liquid chemical measuring tube and the second end of the liquid chemical measuring tube.

Preferably, the control terminal also includes a communication serial port;

the communication serial port is electrically connected to the master control computer; and the communication serial port is used for sending the determined amount of the liquid to a flight control system of the UAV.

Preferably, the liquid chemical tank includes a liquid injection port and a liquid chemical tank cover;

the liquid injection port is arranged at the second end of the liquid chemical tank, and the liquid chemical tank cover covers the liquid injection port to prevent the liquid chemical from spilling out.

The present invention further provides a method for measuring the amount of a liquid chemical in a plant protection UAV, where the method is applied to the above device for measuring the amount of a liquid chemical in a plant protection UAV; the method includes:

acquiring a distance between a liquid chemical level in a liquid chemical measuring tube and a second end of the liquid chemical measuring tube, and recording the distance as a first distance;

acquiring attitude angle data of the UAV, where the attitude angle data includes a roll angle and a pitch angle;

acquiring a distance between a central position of the liquid chemical measuring tube and a central position of a liquid chemical tank, and recording the distance as a second distance; and determining a height of the liquid chemical in the liquid chemical tank according to the first distance, the attitude angle data and the second distance.

Preferably, the first distance is a distance between a center point of the liquid chemical level in the liquid chemical measuring tube and a center point of the second end of the liquid chemical measuring tube.

Preferably, the determining a height of the liquid chemical in the liquid chemical tank according to the first distance, the attitude angle data and the second distance specifically includes:

determining an included angle between the liquid level in the liquid chemical tank and the ground according to the attitude angle data, and recording the included angle as a first included angle;

and determining a height of the liquid chemical in the liquid chemical tank according to the first distance, the first included angle and the second distance.

Preferably, the determining a height of the liquid chemical in the liquid chemical tank according to the first distance, the attitude angle data and the second distance specifically includes:

according to the attitude angle data, adopting formula $\tan^2 \theta = \tan^2 \alpha + \tan^2 \beta$ to determine the first included angle $\theta$; and determining a height b of the liquid chemical in the liquid chemical tank by using formula $b = c \tan \theta + a$ according to the first distance, the first included angle and the second distance;

where $\alpha$ is the roll angle, the $\beta$ is the pitch angle, a is the first distance, and c is the second distance.

According to specific examples of the present invention, the present invention has the following technical effects.

In the device and method for measuring the amount of a liquid chemical in a plant protection UAV, an ultrasonic sensor is adopted to measure a distance between a liquid chemical level in a liquid chemical measuring tube communicated with a liquid chemical tank and a top end of the liquid chemical measuring tube, and then a height of the liquid chemical in the liquid chemical tank is further determined according to an acquired attitude angle of the UAV and a distance between a central position of the liquid chemical measuring tube and a central position of the liquid chemical tank, thereby accurately measuring the amount of the liquid chemical in the liquid chemical tank of the UAV.

Besides, in the technical solutions of the present invention, the amount of the liquid can be measured without contact through the distance measured by the ultrasonic sensor and the flight attitude angle of the UAV. This can avoid the corrosion of the sensor caused by the direct contact between the sensor and the liquid chemical, thereby further prolonging the service life of the device for measuring the amount of a liquid chemical in a plant protection UAV.

BRIEF DESCRIPTION OF THE DRAWINGS

To describe the technical solutions in the examples of the present invention or in the prior art more clearly, the following briefly describes the accompanying drawings required for the examples. Apparently, the accompanying drawings in the following description show merely some examples of the present invention, and a person of ordinary skill in the art may still derive other accompanying drawings from these accompanying drawings without creative efforts.

Figure 1:
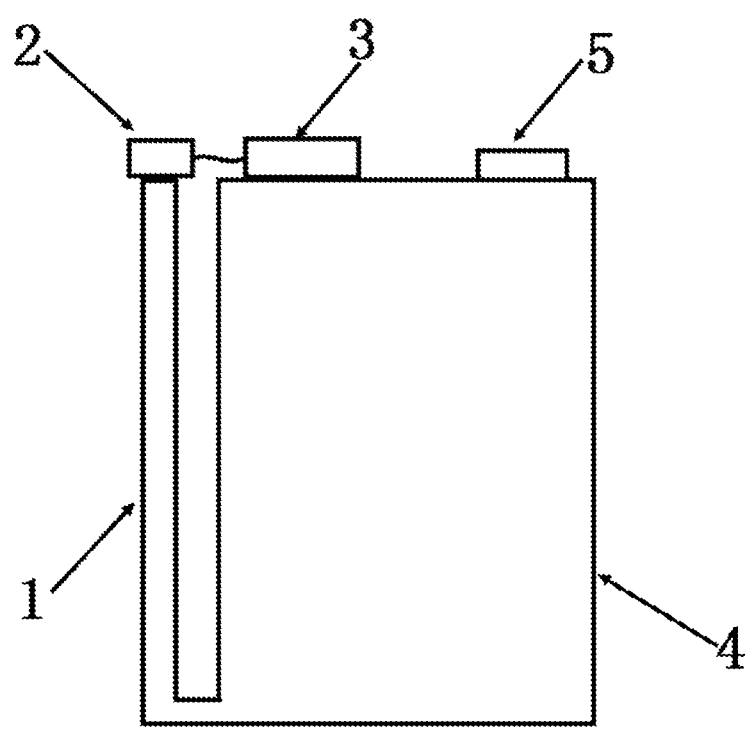
FIG. 1 is a schematic structural diagram of a device for measuring the amount of a liquid chemical in a plant protection UAV according to the present invention.

REFERENCE NUMERALS 1. liquid chemical measuring tube, 2. ultrasonic sensor, 3. control terminal, 4. liquid chemical tank, 5. liquid chemical tank cover.

DETAILED DESCRIPTION

The following clearly and completely describes the technical solutions in the examples of the present invention with reference to accompanying drawings in the examples of the present invention. Apparently, the described examples are merely some rather than all of the examples of the present invention. All other examples obtained by a person of ordinary skill in the art based on the examples of the present invention without creative efforts shall fall within the protection scope of the present invention.

The present invention provides a device and method for measuring the amount of a liquid chemical in a plant protection UAV, so as to accurately measure the amount of the liquid chemical in the UAV without contact.

In order to make the foregoing objectives, features, and advantages of the present invention more understandable, the present invention will be further described in detail below with reference to the accompanying drawings and detailed examples.

FIG. 1 is a schematic structural diagram of a device for measuring the amount of a liquid chemical in a plant protection UAV according to the present invention. As shown in FIG. 1, the device for measuring the amount of a liquid chemical in a plant protection UAV includes a liquid chemical measuring tube 1, an ultrasonic sensor 2, a control terminal 3, and a liquid chemical tank 4.

A first end of the liquid chemical measuring tube 1 is communicated with a first end of the liquid chemical tank 4. As shown in FIG. 1, the liquid chemical measuring tube 1 and the liquid chemical tank 4 are in a U shape after being connected with each other. The U shape in the present invention refers to a shape with a concave area, such as an arc, a semicircle, and a figure composed of a half polygon.

The ultrasonic sensor 2 is fixedly arranged at a second end of the liquid chemical measuring tube 1. The control terminal 3 is fixed at a second end of the liquid chemical tank 4. The ultrasonic sensor 2 is electrically connected to the control terminal 3 through a signal line.

The ultrasonic sensor 2 is used for measuring a distance between a liquid chemical level in the liquid chemical measuring tube 1 and the second end of the liquid chemical measuring tube 1. The control terminal 3 is used for acquiring attitude angle data of the UAV, and further used for determining the amount of the liquid in the liquid chemical tank 4 according to the distance between the liquid chemical level in the liquid chemical measuring tube 1 and the second end of the liquid chemical measuring tube 1 and the attitude angle data. The attitude angle data includes a roll angle and a pitch angle.

In order to measure the amount of the liquid chemical when there is very little liquid chemical left in the liquid chemical tank 4, the diameter of the liquid chemical measuring tube 1 provided in the present invention is preferably less than or equal to 50 mm.

In order to improve the accuracy of measuring the amount of the liquid chemical, in the example of the present invention, the first end of the liquid chemical measuring tube 1 is preferably on the same horizontal plane as the first end of the liquid chemical tank 4.

Besides, the second end of the liquid chemical measuring tube 1 is preferably on the same horizontal plane as the second end of the liquid chemical tank 4.

In a preferred example of the present invention, the control terminal 3 may include a master control computer and an attitude and heading reference system (AHRS).

The master control computer is electrically connected to the AHRS and the ultrasonic sensor 2.

The AHRS is used for measuring attitude angle data of the UAV in real time. The master control computer is used for determining the amount of the liquid in the liquid chemical tank 4 according to the attitude angle data and the distance between the liquid chemical level in the liquid chemical measuring tube 1 and the second end of the liquid chemical measuring tube 1.

Preferably, the control terminal 3 may also include a communication serial port (transistor-transistor logic (TTL) level serial port).

The communication serial port is electrically connected to the master control computer. The communication serial port is used for sending the determined amount of the liquid to a flight control system of the UAV, so that the flight control system of the UAV can control whether the UAV continues to spray the liquid chemical according to the amount of the liquid chemical in real time.

In addition, in another example of the present invention, the liquid chemical tank 4 may include a liquid injection port and a liquid chemical tank cover 5.

The liquid injection port is arranged at the second end of the liquid chemical tank 4, and the liquid chemical tank cover 5 covers the liquid injection port to prevent the liquid chemical from spilling out.

Figure 2:
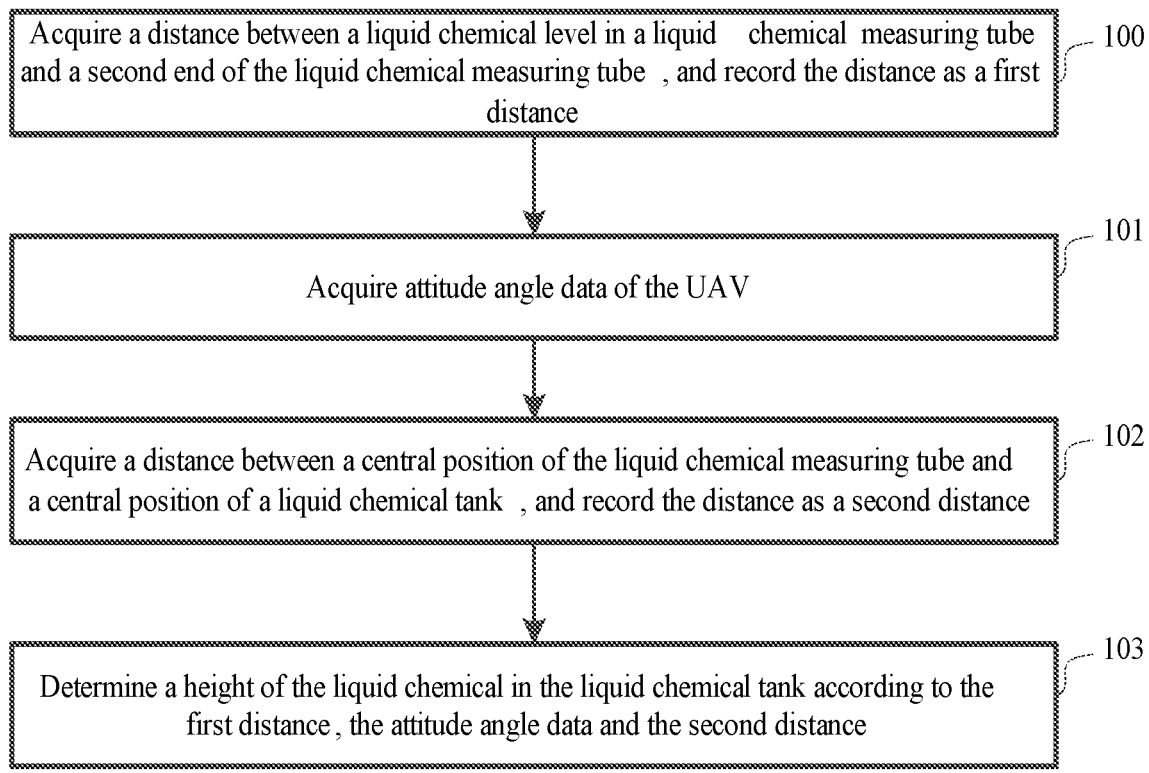
FIG. 2 is a flowchart of a method for measuring the amount of a liquid chemical in a plant protection UAV according to the present invention.

Corresponding to the device for measuring the amount of a liquid chemical in a plant protection UAV according to the present invention, the present invention also provides a method for measuring the amount of a liquid chemical in a plant protection UAV, which is applied to the measuring process of the device for measuring the amount of a liquid chemical in a plant protection UAV. As shown in FIG. 2, the method includes the following steps.

Step 100: acquire a distance between a liquid chemical level in a liquid chemical measuring tube 1 and a second end of the liquid chemical measuring tube 1, and record the distance as a first distance. Preferably, the first distance is a distance between a center point of the liquid chemical level in the liquid chemical measuring tube 1 and a center point of the second end of the liquid chemical measuring tube 1.

Step 101: acquire attitude angle data of the UAV. The attitude angle data includes a roll angle and a pitch angle.

Step 102: acquire a distance between a central position of the liquid chemical measuring tube 1 and a central position of a liquid chemical tank 4, and record the distance as a second distance.

Step 103: determine a height of the liquid chemical in the liquid chemical tank 4 according to the first distance, the attitude angle data and the second distance.

In another example of the present invention, step S103 specifically includes:

determining an included angle between the liquid level in the liquid chemical tank 4 and the ground according to the attitude angle data, and recording the included angle as a first included angle;

and determining a height of the liquid chemical in the liquid chemical tank 4 according to the first distance, the first included angle and the second distance.

In another example of the present invention, step S103 specifically includes:

according to the attitude angle data, adopting formula $\tan^2 \theta + \tan^2 \alpha + \tan^2 \beta$ to determine the first included angle $\theta$; and determining a height b of the liquid chemical in the liquid chemical tank 4 by using formula $b = c \tan \theta + a$ according to the first distance, the first included angle and the second distance, where $\alpha$ is the roll angle, the $\beta$ is the pitch angle, a is the first distance, and c is the second distance.

The following provides a specific example to further illustrate the solutions of the present invention.

Figure 3:
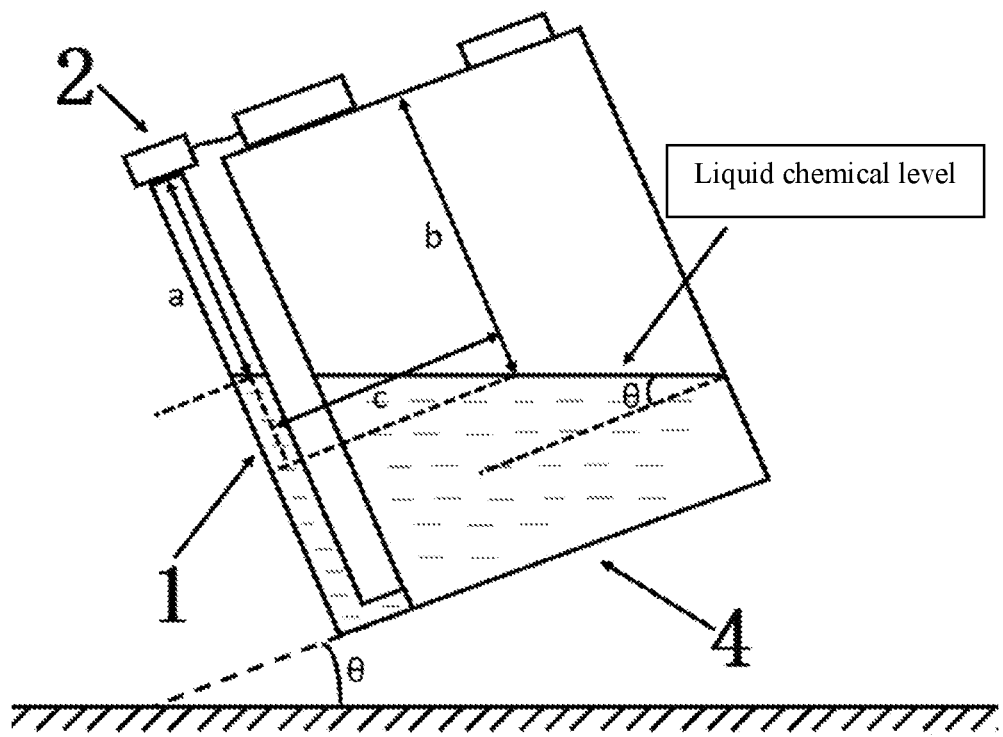
FIG. 3 is a schematic diagram of using the device for measuring the amount of a liquid chemical in a plant protection UAV to measure the amount of the liquid chemical according to an example of the present invention.

As shown in FIG. 3, a specific measuring process for measuring the amount of the liquid chemical in the plant protection UAV by adopting the device and method according to the present invention includes the following steps.

Step 1: as shown in FIG. 3, make the plant protection UAV fly at a certain angle with the horizontal plane rather than parallel to the horizontal plane, and determine by an AHRS in the device that a roll angle of the UAV is $\alpha$ and a pitch angle thereof is $\beta$.

Step 2: communicate a liquid chemical measuring tube 1 with the bottom of a liquid chemical tank 4, where a liquid chemical level in the liquid chemical measuring tube 1 is on the same horizontal plane as a liquid chemical level in the liquid chemical tank 4; and a top plane of the liquid chemical measuring tube 1 is on the same horizontal plane as a top plane of the liquid chemical tank 4. An ultrasonic sensor 2 installed at the top of the liquid chemical measuring tube 1 measures a distance between a liquid level center (specifically referring to the liquid level center when the liquid level is inclined and the liquid level center when the liquid level is horizontal) in the liquid chemical measuring tube 1 and the top, and this distance is measured to be a.

Step 3: obtain an actual included angle $\theta$ between the liquid level and the ground according to the roll angle $\alpha$ and the pitch angle $\beta$ of the UAV as follows:

$$\tan^2 \theta = \tan^2 \alpha + \tan^2 \beta.$$

It is calculated in the direction perpendicular to the liquid level that:

$$b = c \tan + a.$$

Therefore, an actual height b of the liquid chemical is obtained, thereby determining the actual amount of the liquid chemical in the liquid chemical tank 4 in real time.

A distance c between a center point of the liquid chemical measuring tube 1 and a center point of the liquid chemical tank 4 is a specific parameter in the measuring device. The distance c is specifically manually measured when the liquid chemical measuring tube 1 is installed on the liquid chemical tank 4.

The attitude of the plant protection UAV changes in real time during flight, so that the liquid chemical level oscillates. Especially, under the action of specific external wind speed and wind direction, the plant protection UAV needs to have a certain attitude angle with the horizontal direction to maintain a track required by the planning. As a result, directly measuring the distance between the local liquid level and the top of the liquid chemical tank cannot truly reflect the overall remaining amount of the liquid chemical. As a communication pipe between the liquid chemical measuring tube and the liquid chemical tank in the present invention has a small diameter and the liquid level oscillation is extremely small, a measured value of the distance between the liquid level and the top can truly reflect the overall remaining amount of the liquid chemical in the liquid chemical tank.

Each example of the specification is described in a progressive manner, each example focuses on the difference from other examples, and the same and similar parts between the examples may refer to each other.

In this paper, specific examples are used for illustration of the principles and implementations of the present invention. The description of the foregoing examples is used to help understand the method of the present invention and the core ideas thereof. In addition, those of ordinary skill in the art can make various modifications in terms of specific implementations and scope of application in accordance with the teachings of the present invention. In conclusion, the content of the present specification shall not be construed as a limitation to the present invention.

What is claimed is:

1. A method for measuring the amount of a liquid chemical in a plant protection unmanned aerial vehicle (UAV), wherein the method is applied to a device for measuring the amount of a liquid chemical in a plant protection UAV; the device for measuring the amount of a liquid chemical in the plant protection UAV,
    comprising a liquid chemical measuring tube, an ultrasonic sensor, a control terminal, and a liquid chemical tank;
    wherein a first end of the liquid chemical measuring tube is communicated with a first end of the liquid chemical tank;
    wherein the first end of the liquid chemical measuring tube is on the same horizontal plane as the first end of the liquid chemical tank;
    the ultrasonic sensor is fixedly arranged at a second end of the liquid chemical measuring tube;
    the control terminal is fixed at a second end of the liquid chemical tank; the ultrasonic sensor is electrically connected to the control terminal;
    the second end of the liquid chemical measuring tube is on the same horizontal plane as the second end of the liquid chemical tank; the ultrasonic sensor is used for measuring a distance between a liquid chemical level in the liquid chemical measuring tube and the second end of the liquid chemical measuring tube; the control terminal is used for acquiring attitude angle data of the UAV, and further used for determining the amount of the liquid in the liquid chemical tank according to the distance between the liquid chemical level in the liquid chemical measuring tube and the second end of the liquid chemical measuring tube and the attitude angle data; and the attitude angle data comprises a roll angle and a pitch angle; wherein the control terminal comprises a master control computer and an attitude and heading reference system (AHRS); the master control computer is electrically connected to the AHRS and the ultrasonic sensor; the AHRS is used for measuring attitude angle data of the UAV in real time; the master control computer is used for determining the amount of the liquid in the liquid chemical tank according to the attitude angle data and the distance between the liquid chemical level in the liquid chemical measuring tube and the second end of the liquid chemical measuring tube, wherein the method comprises:
    acquiring the distance between the liquid chemical level in the liquid chemical measuring tube and the second end of the liquid chemical measuring tube, and recording the distance between the liquid chemical level in the liquid chemical measuring tube and the second end of the liquid chemical measuring tube as a first distance;
    acquiring attitude angle data of the UAV, wherein the attitude angle data comprises the roll angle and the pitch angle;
    acquiring a distance between a central position of the liquid chemical measuring tube and a central position of the liquid chemical tank, and recording the distance between the central position of the liquid chemical measuring tube and the central position of the liquid chemical tank as a second distance; and
    determining a height of the liquid chemical in the liquid chemical tank according to the first distance, the attitude angle data and the second distance;
    wherein the determining the height of the liquid chemical in the liquid chemical tank according to the first distance, the attitude angle data and the second distance specifically comprises:
    according to the attitude angle data, adopting formula $\tan^2 \theta + \tan^2 \alpha + \tan^2 \beta$ to determine the first included angle $\theta$; and
    determining a height b of the liquid chemical in the liquid chemical tank by using formula $b = c \tan \theta + a$ according to the first distance, the first included angle and the second distance;
    wherein $\alpha$ is the roll angle, the $\beta$ is the pitch angle, a is the first distance, and c is the second distance.

2. The method for measuring the amount of a liquid chemical in a plant protection UAV according to claim 1, wherein the first distance is a distance between a center point of the liquid chemical level in the liquid chemical measuring tube and a center point of the second end of the liquid chemical measuring tube.

* * * * *